United States Patent [19]

Goffing et al.

[11] Patent Number: 5,124,073

[45] Date of Patent: Jun. 23, 1992

[54] CONTINUOUS PREPARATION OF AQUEOUS NON-SELF-EMULSIFYING POLYMER DISPERSIONS

[75] Inventors: Friedrich Goffing, Frankenthal; Joerg Kroker, Neustadt; Rainer Nachtrab; Heino Thiele, both of Ludwigshafen, all of Fed. Rep. of Germany

[73] Assignee: BASF Aktiengesellschaft, Ludwigshafen, Fed. Rep. of Germany

[21] Appl. No.: 476,736

[22] Filed: Feb. 8, 1990

[30] Foreign Application Priority Data

Feb. 18, 1989 [DE] Fed. Rep. of Germany ....... 3905007

[51] Int. Cl.$^5$ .......................... B01J 13/00; C08J 3/05
[52] U.S. Cl. .................................. 252/314; 252/311; 366/79; 366/266; 366/318; 523/501; 523/504; 524/800
[58] Field of Search ............... 252/311, 314; 523/501, 523/504; 524/800; 366/79, 266, 318

[56] References Cited

U.S. PATENT DOCUMENTS

| | | | |
|---|---|---|---|
| 1,923,888 | 8/1933 | Robinson | 252/314 X |
| 2,213,557 | 9/1940 | Tisdale et al. | 252/314 X |
| 3,032,430 | 5/1962 | Heller | 252/314 X |
| 3,635,445 | 1/1972 | Schwab et al. | 366/79 |
| 4,175,871 | 11/1979 | Suh et al. | 366/318 X |
| 4,233,418 | 11/1980 | Lingier et al. | 525/261 X |
| 4,970,258 | 11/1990 | Homma et al. | 524/504 |

*Primary Examiner*—Richard D. Lovering
*Attorney, Agent, or Firm*—Keil & Weinkauf

[57] ABSTRACT

Aqueous non-self-emulsifying polymer dispersions having small particles and a long shelf life and based on highly viscous reaction resins are prepared without the addition of solvents, by means of an intensively dispersing screw apparatus, by a continuous process in which the preparation of the polymer dispersion is carried out in an intensive shear zone of the screw apparatus, the water/reaction resin ratio in this intensive shear zone corresponding to the phase inversion point or being close to it, and the specific energy supply is 0.01-0.15 kWh/kg, the residence time is 0.1-60 sec and the shear gradient is 2,000-20,000 sec$^{-1}$.

4 Claims, 1 Drawing Sheet

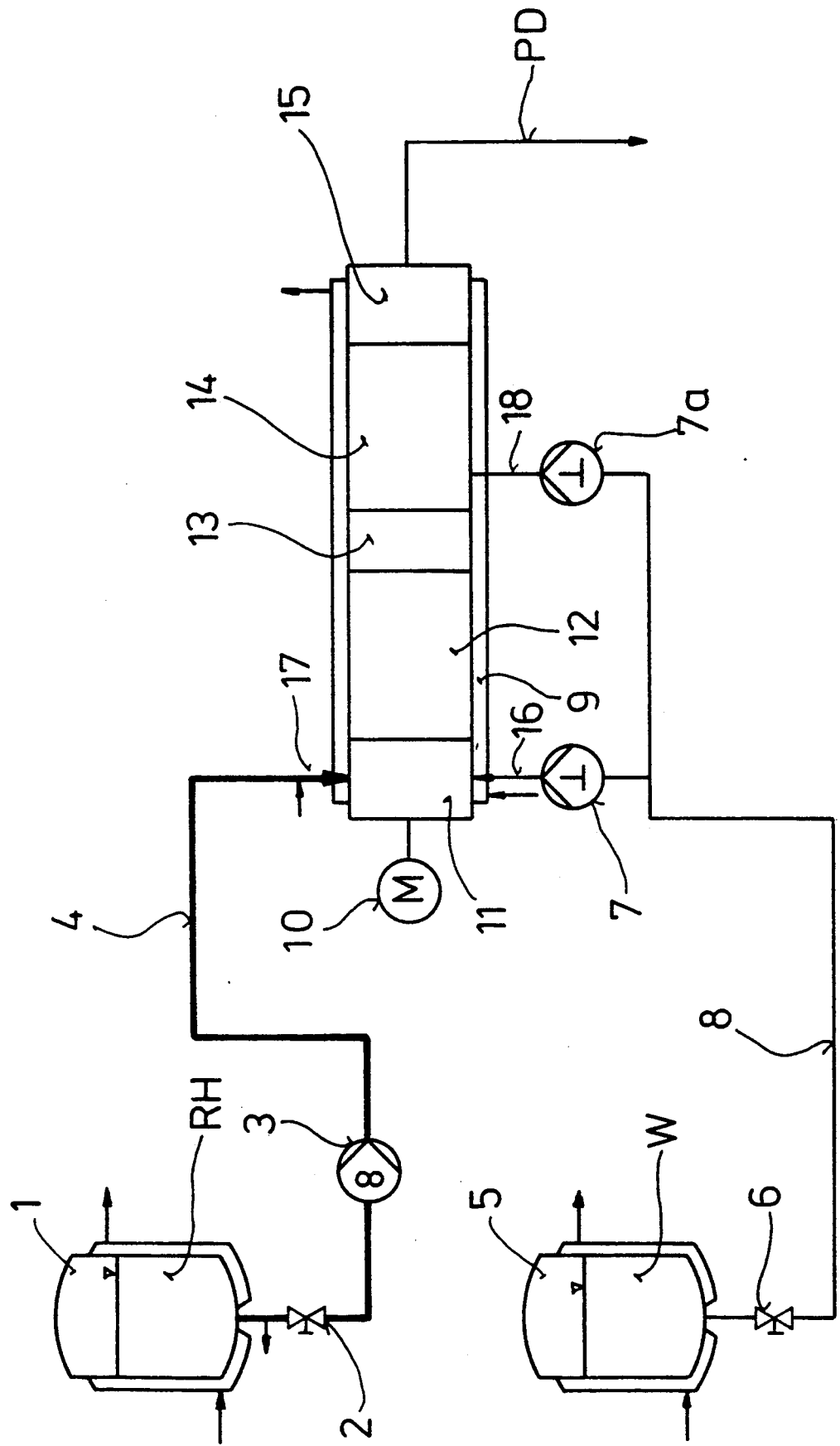

CONTINUOUS PREPARATION OF AQUEOUS NON-SELF-EMULSIFYING POLYMER DISPERSIONS

The present invention relates to a continuous process for the preparation of aqueous non-self-emulsifying polymer dispersions (referred to below as dispersions) having small particles and a long shelf life and based on highly viscous reaction resins, without the addition of solvents, by means of an intensively dispersing screw apparatus.

The reaction resins used are non-self-emulsifying systems. These are, for example, polyurethanes, polyureas, cyanate resins, epoxides, epoxyesters, vinyl esters, saturated polyesters, unsaturated polyesters, bismaleimides, polycondensation resins, for example melamine resins and phenol resins, or combinations of these resins, which are mixed with a sufficient amount of suitable emulsifiers, for example polyols, glycol ethers, ethoxylated alkylphenols, polyethylene oxides and other emulsifiers usually used for this application.

Highly viscous reaction resins are understood as being those having an initial viscosity greater than 100 Pa.s at 45° C.

Such dispersions are used for coating and impregnating textiles, leather, paper, wood, metal, ceramic, glass or porcelain and for coating reinforcing fibers, such as carbon fibers, glass fibers, ceramic fibers, natural fibers and manmade fibers.

Only processes for the preparation of aqueous non-self-emulsifying dispersions from low viscosity reaction resins are known. There are no processes for the preparation of finely divided dispersions having a long shelf life from highly viscous reaction resins.

The most frequently used processes for the preparation of dispersions from low-viscosity reaction resins are batchwise processes in vessels, stirred kettles or dissolvers. A dissolver suitable for this purpose is described in European Patent 0,112,619. In such batch processes, as a rule the low-viscosity resin is initially taken and is dispersed using a stirrer or a dissolver disk with the addition of water. It is known that such stirrers or dissolvers can be used for dispersing only in the low-viscosity range, because in the case of highly viscous reaction resins laminar flow occurs around the stirring element, so that the dispersing effect decreases considerably.

Further disadvantages associated with the batch process are the large dimensions of the apparatus, large amounts of product and consequently long residence times Furthermore, the individual batches can be prepared only with the usual quality fluctuations.

In the case of continuous processes too, only processes for the preparation of low-viscosity aqueous non-self-emulsifying dispersions are known. Such processes are described in, for example, U.S. Pat. No. 4,742,095 and British Patent 1,414,930. However, these processes cannot be used in the high viscosity range, owing to the dispersing apparatuses employed.

Furthermore, it is stated in the literature that the mean particle size of the dispersion increases with increasing viscosity of the reaction resin, owing to the lower dispersing effect of the known processes in the high viscosity range. In Journal of Elastomers and Plastics, 12, 45 et seq., Yoshiyuki Iwase states that reaction resins having viscosities of 10 Pa.s or higher are more poorly dispersible and those having viscosities of 100 Pa.s or higher are virtually completely non-dispersible.

In addition to the fact that these known processes cannot be used in the high viscosity range owing to their unsuitable dispersing apparatuses, the lack of effective temperature control furthermore rules out their use in the high viscosity range. In the dispersing of very highly viscous reaction resins to give finely divided dispersions having a long shelf life, there is a high degree of energy dissipation, which leads to considerable heating of the product. If this heat of dispersion is not removed very rapidly, the result is coagulation and hence a short shelf life.

Both in the known batch processes and in the continuous processes, effective cooling which is necessary for the high viscosity range is not present.

In the prior art, finely divided dispersions having a long shelf life are prepared from highly viscous reaction resins by dilution with solvents, as described in German Patent 3,233,230 or U.S. Pat. No. 4,409,288. Conventional solvents are acetone, xylene, ethoxyethylene glycol, etc. However, the use of these solvents is associated with the following disadvantages:

Because of their toxicity and flammability, these solvents must be removed completely from the ready-prepared dispersion, generally by distillation.

This is time-consuming and expensive and is difficult owing to the stable foam which occurs during degassing of the ready-prepared dispersion. Furthermore, the heating during the distillation causes the shelf life to decrease.

A reduction in the viscosity during dispersing in the high viscosity range using suitable dispersing elements means an increase in particle size and hence a decrease in the shelf life of the ready-prepared dispersion.

It is known that the mean particle size decreases with increasing supply of energy, assuming that a suitable dispersing process with which this energy supply can be realized is available However, in the high viscosity range, the energy supplied increases with increasing viscosity. This means that the addition of solvents is associated with an increase in the mean particle diameter and hence leads to a shorter shelf life.

In addition to the stated qualitative disadvantages associated with the preparation of dispersions from low viscosity reaction resins, there are also logistic disadvantages.

The dispersions are generally prepared in a place which is not the place where processing is to be carried out. In order to save transport costs, it would be economical to transport only dispersion concentrates and to dilute these with water to their particular application concentration at the place of use.

Since the dispersion concentrates are very highly viscous (at the phase inversion point with the smallest theoretical amount of water and maximum viscosity), they cannot be prepared according to the prior art in finely divided form with a long shelf life.

Because of the disadvantages described, it is an object of the present invention to provide a continuous process for the preparation of aqueous non-self-emulsifying polymer dispersions having small particles and a long shelf life and based on highly viscous reaction resins, without the addition of solvents.

We have found that this object is achieved, according to the invention, if the preparation of the polymer dispersions is carried out in an intensive shear zone of the screw apparatus, the water/reaction resin ratio in this intensive shear zone corresponding to the phase inversion point or being close to it, and the specific energy supply is 0.01–0.15 kWh/kg, the residence time is 0.1–60 sec and the shear gradient is 2,000–20,000 sec$^{-1}$.

The subclaims relate to further features of the novel process.

The phase inversion point designates the water/oil ratio at which the water-in-oil emulsion becomes an oil-in-water emulsion.

The maximum viscosity is achieved by means of the procedure at or near the phase inversion point. This leads to a maximum supply of energy and hence to the smallest possible particle diameters.

However, since pronounced energy dissipation occurs during the dispersing process owing to the high viscosity, if the coagulation temperature is exceeded, coagulation of the particles must be prevented immediately thereafter by adding further cold water in a downstream second intensive shear zone of the screw apparatus.

The coagulation temperature is determined by virtue of the fact that the stable dispersion coagulates on reaching the coagulation temperature and is no longer stable.

By preparation of the dispersion at or near the phase inversion point and, if necessary, subsequent cooling with additional water, a dispersion having very small particles and a long shelf life is obtained.

An apparatus which can advantageously be used for the process according to the present invention is shown in the flow diagram for the process.

BRIEF DESCRIPTION OF DRAWING

The FIGURE shows the flow diagram for the process of this invention.

The highly viscous reaction resin RH together with the emulsifier is stored in a heatable kettle 1. The temperature of the resin is adjusted so that it is free-flowing and can be sucked in and transported by means of the gear pump 3. A heated shut-off valve 2 is installed between kettle 1 and gear pump. The pipeline 4 for the resin between kettle 1 and the screw apparatus 9 is heatable.

The water W is stored in a cooled kettle 5. For reasons relating to the quality of the subsequently produced dispersion, it is advantageous to reduce the temperature to close to 0° C. This will be explained later. The valve 6 serves for isolating the kettle 5. The water is metered via pipeline 8 into the screw apparatus 9 by means of a reciprocating pump 7 If the pipeline 8 is long, it should be cooled in order to avoid heating up the water.

The intensively dispersing screw apparatus 9 used may be a high speed single-screw apparatus driven by an electric motor 10.

The screw apparatus is cooled. For reasons relating to the quality of the dispersion, it is advantageous to cool the screw apparatus to as low a temperature as possible.

In the first zone 11 of the screw apparatus, the highly viscous reaction resin is introduced via barrel orifice 17 and some of the water is added via barrel orifice 16. This zone of the screw apparatus is equipped with screw parts which transport the reaction resin into the actual dispersing zone 12. Dispersing in the dispersing zone 12 is carried out in such a way that the water/resin ratio corresponds to the phase inversion point or is as close as possible to this. This procedure ensures that dispersing is carried out at the maximum viscosity of the dispersion. This results in a minimum mean particle diameter.

Since the high viscosity gives rise to considerable energy dissipation in the dispersing zone 12, the screw apparatus is cooled and, if the coagulation temperature is exceeded, further cold water is added to the dilution zone 14 immediately thereafter in order to prevent coagulation of the particles. This gives a dispersion having small particles and a very long shelf life.

If it is not necessary to reduce the temperature downstream of the dispersing zone 12 owing to adequate stability, there is no need to add further water.

It is now also clear why the kettle 5 is cooled with water to close to 0° C. The reaction resin temperature in kettle 1 should therefore also be just high enough to ensure that the reaction resin is free-flowing.

Since the specific capacity of water is about a factor of 2 to 3 higher than that of the reaction resin, a reinforcing effect occurs with regard to temperature limitation during the dispersing process. Furthermore, the screw apparatus 9 and in particular the dispersing zone 12 are cooled.

In addition to these cooling effects, however, residence times and the shear gradient in the dispersing zone 12 are of great importance for the resulting temperature increase.

The dispersing zone 12 must be in the form of an intensively dispersing mixing zone with high shear gradients so that the required dispersing time is minimized, heating of the dispersion is kept short and the product is not damaged.

The dispersing zone 12 must be designed so that there is a specific energy supply of from 0.01 to 0.15 kWh/kg, a shear gradient of from 2,000 to 20,000 sec$^{-1}$ and a residence time of from 0.1 to 60 sec. Higher specific energies and longer residence times have an adverse effect on the quality of the dispersion owing to excessive thermal stresses.

Rotor/stator systems having narrow gaps can advantageously be used.

The dispersion paste is transported from the dispersing zone 12 to the dilution zone 14 by the screw parts 13.

The additional water is introduced by means of the reciprocating pump 7a through a further barrel orifice 18 into the dilution zone 14.

Since the dispersion is ready at this point and only a dilution step is to be carried out, there is no longer any need for a high specific energy supply for mixing. Rotor/stator systems which have large gaps and thus have, for example, a shear gradient and a specific energy input which are a factor of 2 or more lower than those in the dispersing zone 12 can advantageously be used.

This is advantageous since it avoids pronounced heating In the dilution zone 14, water can also be added at further points, for example via further pumps If a dispersion concentrate having a high solids content is desired, it is possible to add no water or to add water only in an amount such that the coagulation temperature is not exceeded.

After the dilution zone 14, a polymer dispersion PD is discharged by means of further screw parts 15.

EXAMPLE 1

A resin formulation consisting of 85% of epoxy resin and 15% of emulsifier (Pluronic F108 ®; BASF Corporation) and having a viscosity of 250 Pa.s at 50° C. is metered into the first dispersing zone of the screw apparatus by means of a gear pump at a mass flow rate of 32.5 kg/h. In order to achieve sufficient flow of the resin formulation, the latter is heated to 65° C. in the kettle.

In a second kettle, water at 1° C. is metered into the first dispersing zone of the screw apparatus by means of a reciprocating pump at a mass flow rate of 8.1 kg/h.

The screw apparatus used is a high speed single-screw apparatus. The barrels of the screw apparatus are cooled. The rotary speed is 900 min$^{-1}$.

The water/epoxy resin ratio is 0.29 and hence close to the phase inversion point.

In the screw apparatus, a rotor/stator system having a gap of 0.5 mm is used in the first dispersing stage. The shear gradient is 5,000 sec$^{-1}$, the residence time 10 sec and the specific energy supply 0.05 kWh/kg.

In the dilution stage, further water at 1° C. is added at a mass flow rate of 14.2 kg/h.

A dispersion in which 90% of the dispersed particles are smaller than 1.0 μm is obtained.

The dispersion possesses very good mechanical, gravimetric and volumetric stability.

EXAMPLE 2

A resin formulation consisting of 85% of epoxy resin and 15% of emulsifier (Pluronic F108 ®; BASF Corporation) and having a viscosity of 100 Pa.s at 50° C. is metered into the first dispersing zone of the screw apparatus by means of a gear pump at a mass flow rate of 108.4 kg/h. In order to achieve sufficient flow of the resin formulation, the latter is heated to 65° C. in the kettle.

In a second kettle, water at 1° C. is metered into the first dispersing zone of the screw apparatus by means of a reciprocating pump at a mass flow rate of 27.0 kg/h.

The screw apparatus used is a high speed single-screw apparatus. The barrels of the screw apparatus are cooled. The rotary speed is 3,500 min$^{-1}$.

The water/epoxy resin ratio is 0.29 and hence close to the phase inversion point.

In the screw apparatus, a rotor/stator system having a gap of 0.5 mm is used in the first dispersing stage. The shear gradient is 20,000 sec$^{-1}$, the residence time 3 sec and the specific energy supply 0.10 kWh/kg.

In the dilution stage, further water at 1° C. is added at a mass flow rate of 70.0 kg/h.

A dispersion in which 90% of the dispersed particles are smaller than 0.7 μm is obtained.

The dispersion possesses very good mechanical, gravimetric and volumetric stability.

EXAMPLE 3

A resin formulation consisting of 85% of epoxy resin and 15% of emulsifier (Pluronic F108 ®; BASF Corporation) and having a viscosity of 825 Pa.s at 50° C. is metered into the first dispersing zone of the screw apparatus by means of a gear pump at a mass flow rate of 6.1 kg/h. In order to achieve sufficient flow of the resin formulation, the latter is heated to 65° C. in the kettle.

In a second kettle, water at 1° C. is metered into the first dispersing zone of the screw apparatus by means of a reciprocating pump at a mass flow rate of 1.5 kg/h.

The screw apparatus used is a high speed singlescrew apparatus. The barrels of the screw apparatus are cooled. The rotary speed is 350 min$^{-1}$.

The water/epoxy resin ratio is 0.29 and hence close to the phase inversion point.

In the screw apparatus, a rotor/stator system having a gap of 0.5 mm is used in the first dispersing stage. The shear gradient is 2,000 sec$^{-1}$, the residence time 53 sec and the specific energy supply 0.15 kWh/kg.

In the dilution stage, further water at 1° C. is added at a mass flow rate of 7.1 kg/h.

A dispersion in which 90% of the dispersed particles are smaller than 0.8 μm is obtained.

The dispersion possesses very good mechanical, gravimetric and volumetric stability.

EXAMPLE 4

A resin formulation consisting of 85% of epoxy resin and 15% of emulsifier (Pluronic F108 ®; BASF Corporation) and having a viscosity of 400 Pa.s at 50° C. is metered into the first dispersing zone of the screw apparatus by means of a gear pump at a mass flow rate of 361 kg/h. In order to achieve sufficient flow of the resin formulation, the latter is heated to 65° C. in the kettle.

In a second kettle, water at 1° C. is metered into the first dispersing zone of the screw apparatus by means of a reciprocating pump at a mass flow rate of 90.1 kg/h.

The screw apparatus used is a high speed single-screw apparatus. The barrels of the screw apparatus are cooled. The rotary speed is 1,800 min$^{-1}$.

The water/epoxy resin ratio is 0.29 and hence close to the phase inversion point.

In the screw apparatus, a rotor/stator system having a gap of 0.5 mm is used in the first dispersing stage. The shear gradient is 10,000 sec$^{-1}$, the residence time 0.3 sec and the specific energy supply 0.01 kWh/kg.

No further water is added.

A dispersion in which 90% of the dispersed particles are smaller than 1.4 μm is obtained.

The dispersion possesses very good mechanical, gravimetric and volumetric stability.

We claim:

1. A continuous process for the preparation of an aqueous non-self-emulsifying polymer dispersion having small particles and a long shelf life and based on a reaction resin having an initial viscosity greater than 100 Pa.s at 45° C., without the addition of solvents, by means of an intensively dispersing screw apparatus, wherein the preparation of the polymer dispersion is carried out in an intensive shear zone of the screw apparatus, the water/reaction resin ratio in this intensive shear zone corresponding to the phase inversion point or being close to it, and
   the specific energy supply is 0.01–0.15 kWh/kg,
   the residence time is 0.1–60 sec and
   the shear gradient is 2,000–20,000 sec$^{-1}$.

2. A process as defined in claim 1, wherein, if the temperature is too high after the intensive shear zone, water is additionally introduced into the dispersion paste in a downstream second intensive shear zone having a substantially lower specific energy supply, in such a way that the coagulation temperature of the polymer dispersion is not exceeded after the said dispersion leaves the second intensive shear zone.

3. A process as defined in claim 1, wherein further water is introduced into the screw apparatus at other points downstream.

4. A process as defined in claim 1, wherein a highly concentrated polymer dispersion is prepared in which the solids concentration corresponds to the solids concentration at the phase inversion point.

* * * * *